May 27, 1952
T. W. JOHNSON, JR
2,597,997
ORANGE JUICE EXTRACTOR
Filed July 3, 1950
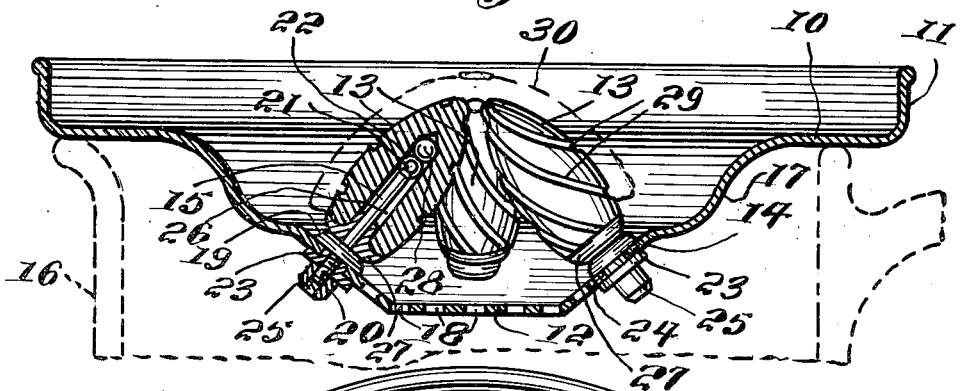
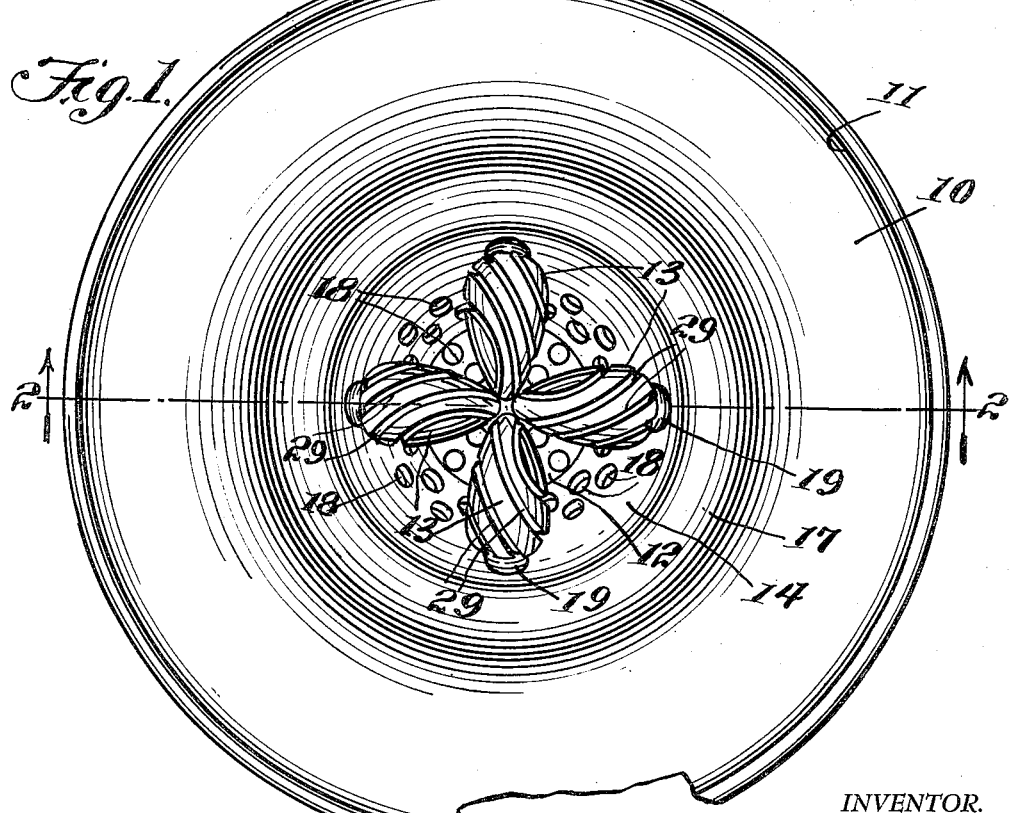
INVENTOR.
Theodore Woolsey Johnson, Jr.
BY Victor J. Evans & Co.
ATTORNEYS Patented May 27, 1952

2,597,997

UNITED STATES PATENT OFFICE 2,597,997

ORANGE JUICE EXTRACTOR

Theodore Woolsey Johnson, Jr., Annapolis, Md.

Application July 3, 1950, Serial No. 171,837

3 Claims. (Cl. 146—3)

This invention relates to devices for removing juice from citrus fruits such as oranges, grapefruit, and the like wherein the fruit is cut in half before the juice is removed therefrom, and in particular a juice extractor that efficiently removes the juice with a rolling instead of a scraping action wherein the juice is not contaminated with objectional bitter oils from the rind or with the web between the pulp cells, and in which the juice is removed with comparatively light pressure.

The purpose of this invention is to provide an improved orange juice extractor which efficiently removes the juice without the web between the cells and in which straining is, therefore, not required.

The usual citrus fruit juicer that is manually actuated requires considerable pressure to force the half of an orange downwardly over the element, and when the juicer is motor driven substantially all of the web and parts of the rind are scraped out with the juice. The rind contains bitter oils that give a foreign taste to the juice and the web between the cells must be strained from the juice before it is used.

With these thoughts in mind this invention contemplates an improved juicer for citrus fruits wherein a half of an orange is held over a plurality of angularly positioned conical elements which rotate independently as the half of the orange is turned whereby the pulp and juice are removed without scraping the web between the cells of the fruit, and also without scraping parts of the rind into the juice.

The object of this invention is, therefore, to provide means for mounting the elements of an orange juicer so that the juice is removed with a rolling action.

Another object of the invention is to provide an orange juicer which produces a greater yield of juice from oranges than juicers now in use.

Another object of the invention is to provide an orange juicer in which an area is provided around the juice removing elements for the accumulation of seeds.

A further object of the invention is to provide an orange juicer having a rolling action which is of a simple and economical construction.

With these and other objects and advantages in view the invention consists of the new and novel combination, construction, and arrangement of parts as hereinafter more fully described, set forth in the claims appended hereto, and disclosed in the accompanying drawings, forming part hereof, wherein:

Figure 1 is a plan view of the juice extractor.

Figure 2 is a cross section through the extractor taken on line 2—2 of Figure 1, with parts shown in elevation and parts in section.

Referring now to the drawings wherein like reference characters indicate corresponding parts the fruit juice extractor of this invention includes a tray 10 having a circumferential flange 11 and a perforated center 12, and a plurality of fluted conical-shaped elements 13 rotatably mounted on a section 14 of the tray by spindles 15. The spindles 15 mounting the conical-shaped elements 13 are angularly disposed and extend radially and inwardly toward the vertical central axis of the tray. This arrangement places the tips of the conical-shaped elements in position to be contiguous with each other and to form a cluster at the center of the tray to remove the juice and pulp from the rind of fruit as will be later described.

The tray 10 is adapted to be positioned upon a glass, cup, or container, as indicated by the dotted lines 16, and the central portion 17 thereof is dished downwardly with the section 14 formed therein and with the wall terminating in the perforated center 12 which has perforations 18 therein.

The spindles 15 are formed with collars 19 and threaded studs 20 at the lower ends, and with heads 21 on whcih friction caps 22 are positioned, at the upper ends. The studs 20 are threaded in bushings 23 which are positioned in openings 24 in the section 14 of the tray, and the ends of the studs are provided with lock nuts 25. The elements or rollers 13 are provided with bores 26 having bushings 27 frictionally mounted in the lower ends thereof, forming bearings, and balls 28 are provided in the upper ends of the bores which contact the caps 22 to facilitate rotation of the juice removing elements. The outer surfaces of the elements 13 are provided with arcuate grooves providing flutes 29 which, primarily remove seed from the fruit.

With the parts arranged in this manner one-half of an orange or the like as indicated by the dotted lines 30 may be held on the elements 13, as shown in Figure 2, and as the one-half of the orange is turned by hand the elements 13 will rotate so that the juice and pulp are removed without scraping the web between the pulp cells from the rind or without removing parts of the rind.

As the juicer or extractor is used seeds will accumulate in the lower part of the tray below the elements 13, and the juice will run through the perforations 18 and into the container, thereby eliminating the necessity of straining the juice as it is removed from the device.

It will be understood that modifications may be made in the design and arrangement of the parts without departing from the spirit of the invention.

What is claimed is:

1. A fruit juice extractor comprising a tray having a downwardly extending central section with perforations in the central portion thereof, a plurality of angularly disposed radially and inwardly extending fluted conical-shaped elements positioned in the central section of said tray so as to be contiguous and to form a cluster, and means rotatably mounting said conical-shaped elements on the said central section of the tray with the upper pointed ends of said conical-shaped elements converging toward and slightly spaced from the center of the tray to act as a unit to extract the juice from a single fruit half.

2. In a fruit juicer for removing juice from halves of oranges and the like, a tray having a downwardly dished central portion with perforations in the lower end thereof, a plurality of conical-shaped juice removing elements nested in the central portion of the tray, angularly positioned spindles mounted in the tray with the upper ends thereof converging radially and inwardly toward the center of the tray, and means rotatably mounting the said juice removing elements on the said spindles so that said elements are contiguous and form a cluster to extract the juice from a single fruit half.

3. In a fruit juicer, the combination, which comprises, a tray having a downwardly dished central portion with perforations in the center thereof, a plurality of angularly disposed radially and inwardly extending spindles mounted in the central portion of said tray with the upper ends thereof converging toward the center of the tray, a plurality of fluted conical-shaped juice removing elements rotatably mounted on said spindles so as to be contiguous and to form a cluster which acts as a unit to extract the juice from a single fruit half, and balls in the juice removing elements at the upper ends of the spindles.

THEODORE WOOLSEY JOHNSON, Jr.

REFERENCES CITED

The following references are of record in the file of this patent:

UNITED STATES PATENTS

| Number | Name | Date |
|---|---|---|
| 1,860,587 | Metzger | May 31, 1932 |
| 2,046,739 | Harrington | July 7, 1936 |
| 2,087,979 | Kennedy | July 27, 1937 |
| 2,199,876 | Brown | May 7, 1940 |
| 2,318,370 | Burch | May 4, 1943 |
| 2,428,157 | Healy | Sept. 30, 1947 |
| 2,500,238 | Baker et al. | Mar. 14, 1950 |